No. 741,876. PATENTED OCT. 20, 1903.
D. BEST.
SIDEHILL HARVESTING MACHINE.
APPLICATION FILED JULY 17, 1902.
NO MODEL. 6 SHEETS—SHEET 1.

Witnesses,
Inventor,
Daniel Best

No. 741,876. PATENTED OCT. 20, 1903.
D. BEST.
SIDEHILL HARVESTING MACHINE
APPLICATION FILED JULY 17, 1902.
NO MODEL. 6 SHEETS—SHEET 2.

Witnesses,
E. A. Brandau
J. H. Rowse

Inventor,
Daniel Best
By Dewey Strong & Co.
atty

No. 741,876. PATENTED OCT. 20, 1903.
D. BEST.
SIDEHILL HARVESTING MACHINE.
APPLICATION FILED JULY 17, 1902.
NO MODEL. 6 SHEETS—SHEET 4.

WITNESSES: INVENTOR.
Daniel Best
BY
ATTORNEYS

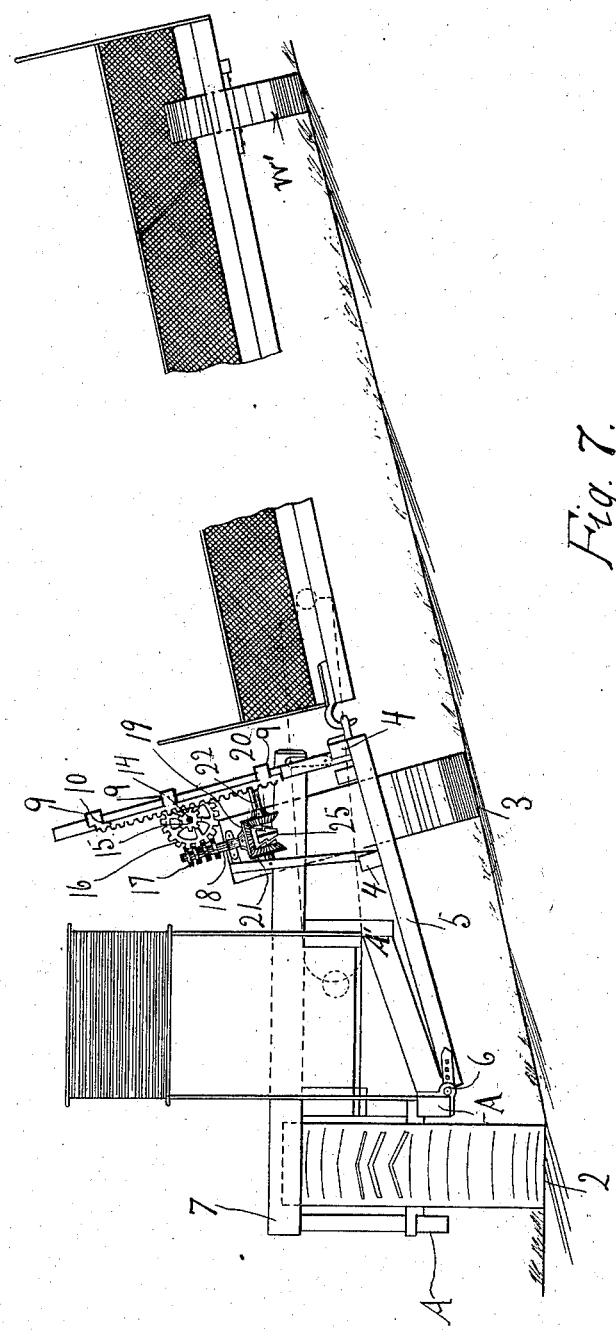

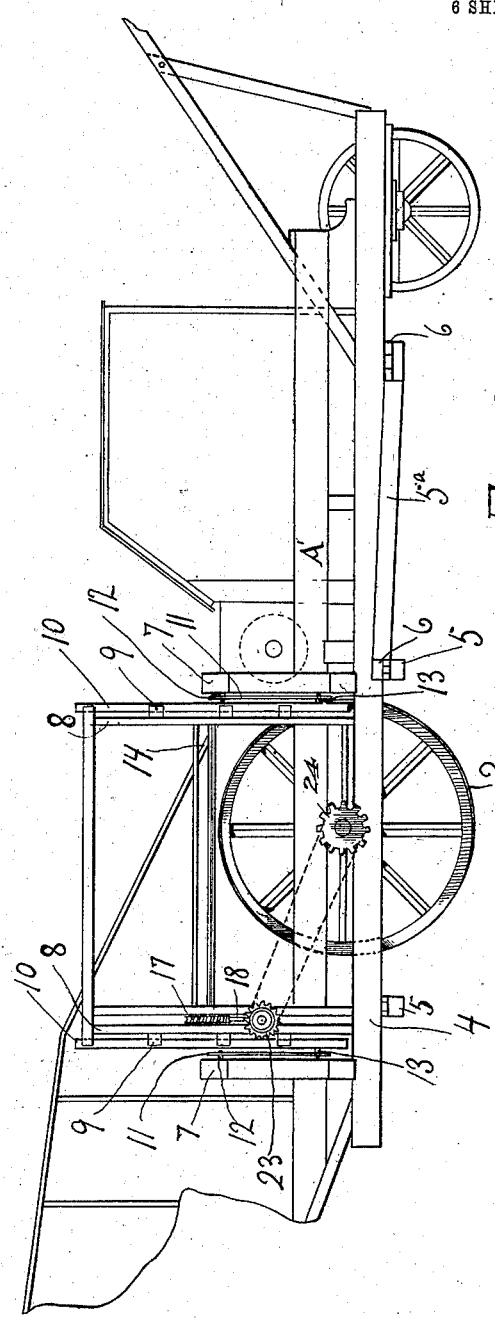

No. 741,876.

Patented October 20, 1903.

UNITED STATES PATENT OFFICE.

DANIEL BEST, OF SAN LEANDRO, CALIFORNIA.

SIDEHILL HARVESTING-MACHINE.

SPECIFICATION forming part of Letters Patent No. 741,876, dated October 20, 1903.

Application filed July 17, 1902. Serial No. 115,934. (No model.)

*To all whom it may concern:*

Be it known that I, DANIEL BEST, a citizen of the United States, residing in the city of San Leandro, county of Alameda, State of California, have invented an Improvement in Sidehill Harvesting-Machines; and I hereby declare the following to be a full, clear, and exact description of the same.

My invention relates to that class of harvesting machinery which is specially designed for cutting, threshing, and cleaning grain, and in which the machine is mounted upon wheels and adapted to travel over the field in which the grain stands, being propelled either by animal or mechanical power.

It consists in a means for changing the position of the bearing-wheels relative to each other in such manner that the threshing and cleaning mechanism of the apparatus may be maintained substantially level in the direction transverse to the line of travel and when the machine is traveling upon sidehills or inclined ground, which would otherwise throw the said mechanism out of level.

It also comprises details of construction which will be more fully explained by reference to the accompanying drawings, in which—

Figure 1:
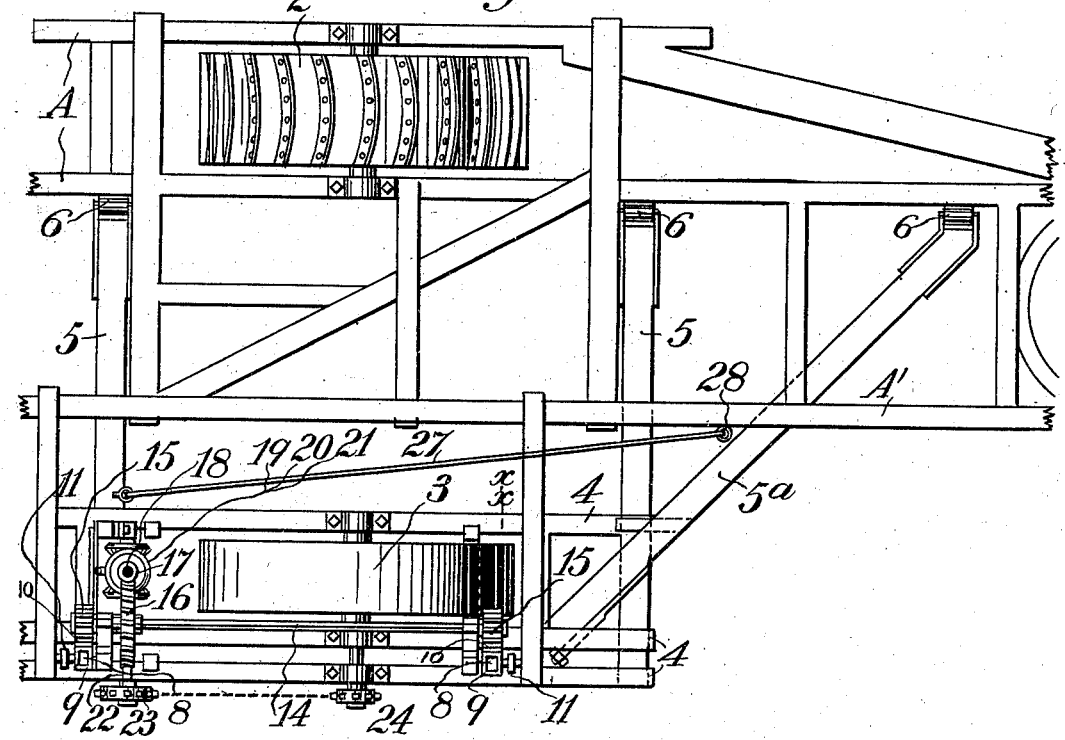
Figure 2:
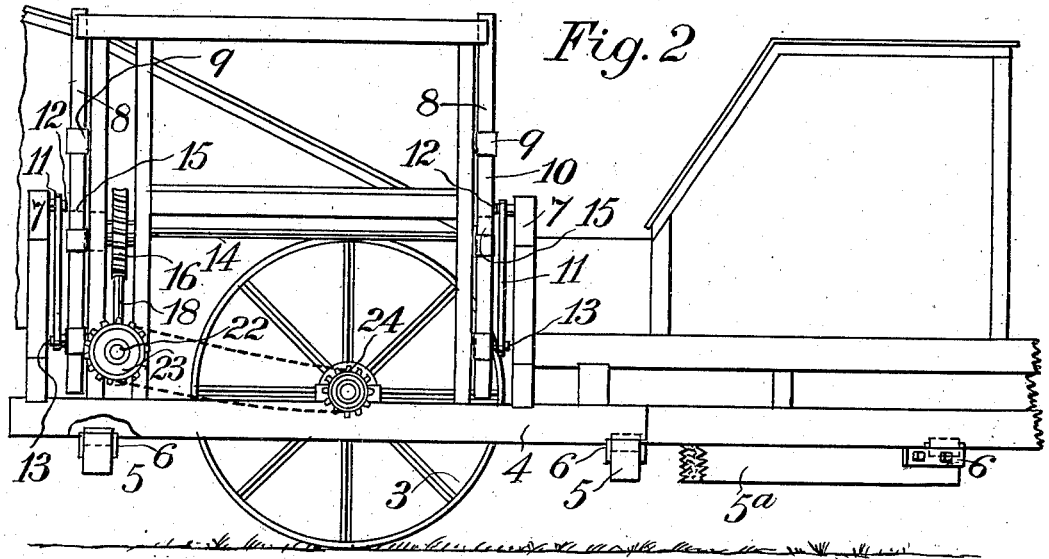
Figure 3:
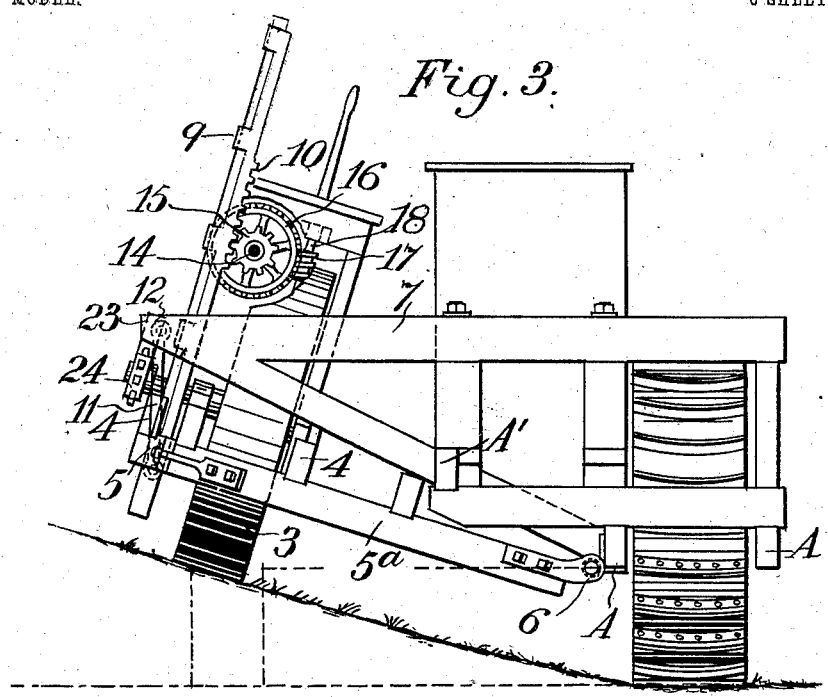
Figure 9:
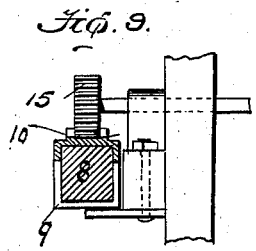
Figure 4:
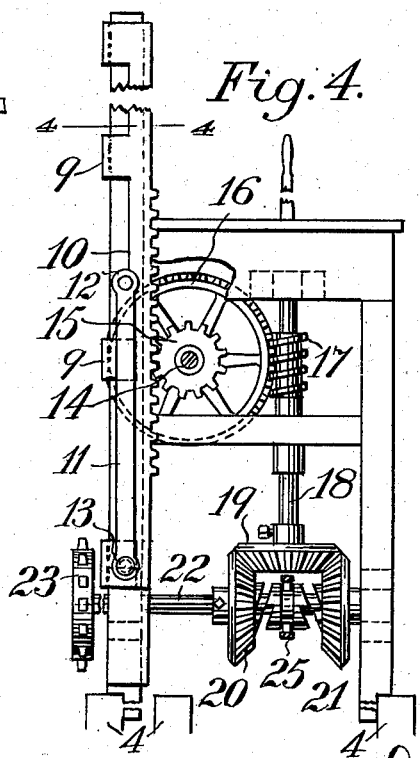
Figure 5:
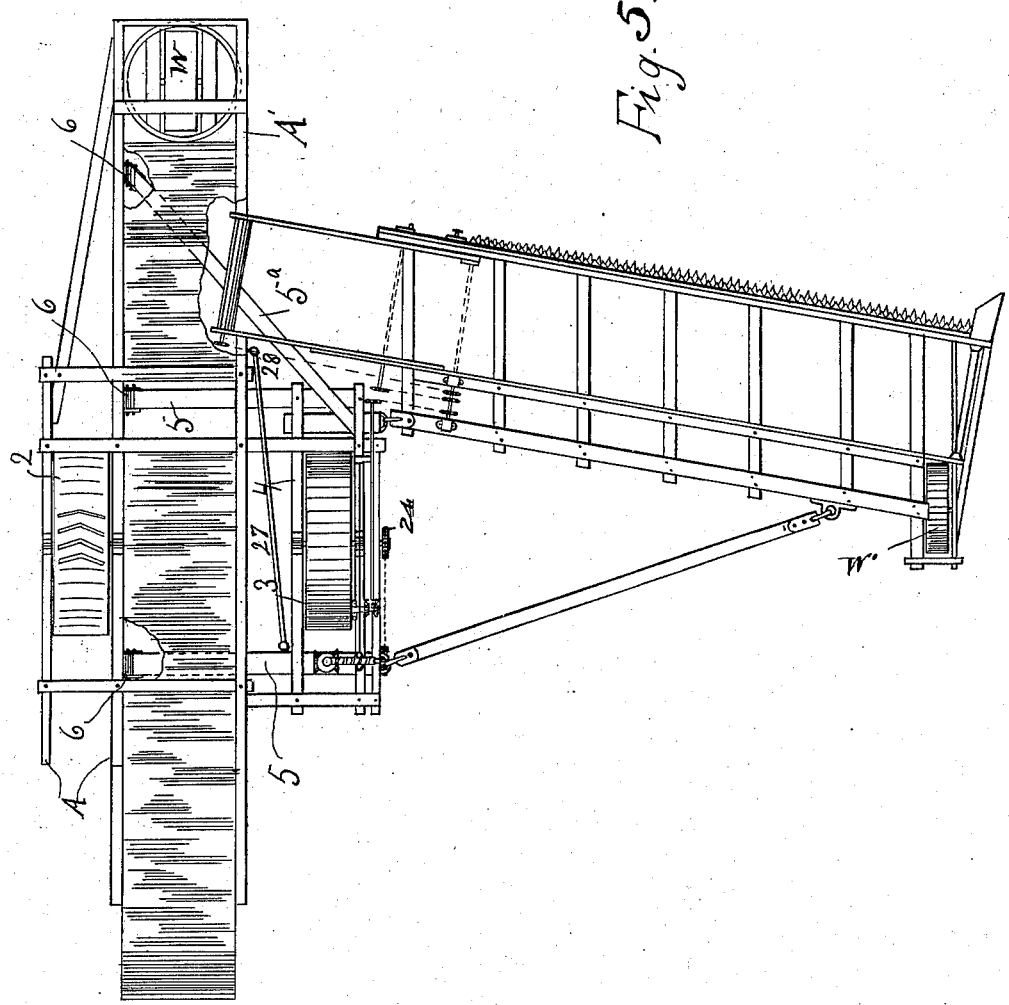
Figure 6:
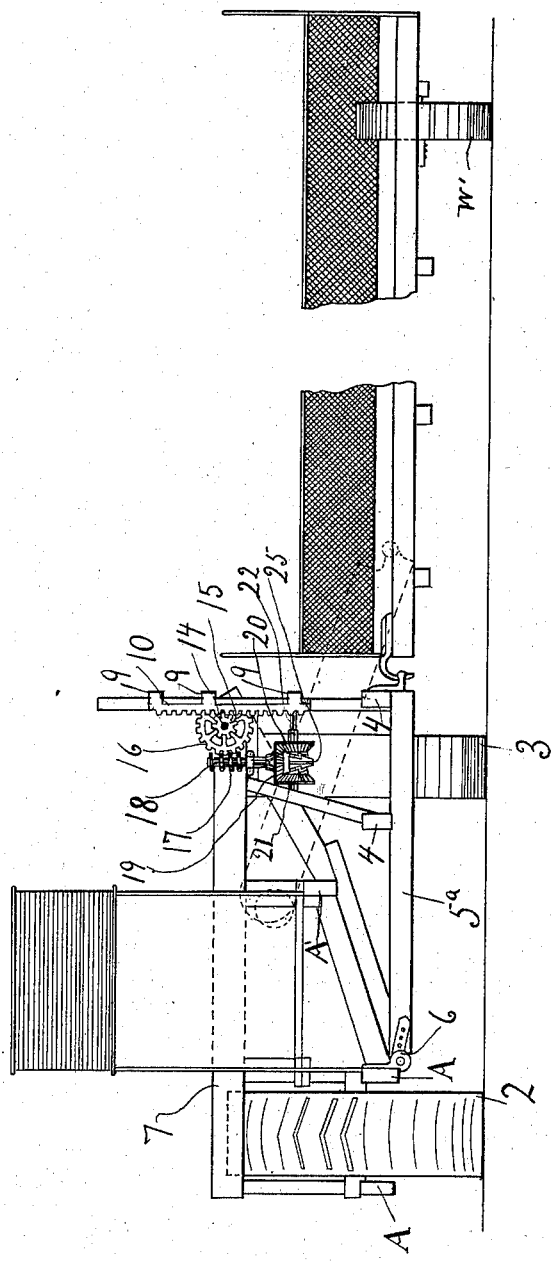

Figure 1 is a plan view of the lower part of the framework, showing the manner of connecting the hinged frame with the main frame. Fig. 2 is a side elevation. Fig. 3 is a transverse elevation. Fig. 4 is a detail view of the worm mechanism. Fig. 5 is a plan view of a sidehill-harvester embodying my invention. Fig. 6 is a rear view of the machine as when working on a level. Fig. 7 is a similar view of the machine as when working on an incline, as the side of a hill. Fig. 8 is a side elevation showing the header removed. Fig. 9 is an enlarged cross-sectional view on the line 4 4 of Fig. 4, showing the clamps 9 and rack-bar and pinion.

There is considerable difficulty in properly cleaning the grain which is threshed in traveling harvesters when such machines are operated upon sidehills, it being necessary for the best operation of such machines that they should travel at substantially right angles with the general slope or inclination of the hill, and in ordinary machines not provided with the means for leveling the cleaning machinery the grain and chaff will slide down to one side of the cleaning-shoes, leaving the upper sides of the screens nearly bare and massing the material at the other side in such manner that no efficient cleaning can be effected.

It is the object of my invention to provide a means by which the main portion of the threshing and cleaning apparatus can be maintained approximately level whatever may be the slope of the hillside upon which the machine is traveling. I effect this by means of a frame in which the bearing-wheel adjacent to the cutting mechanism is journaled, which frame is hinged to the main frame at a point on the opposite side and near the opposite bearing-wheel. In conjunction with this I employ mechanism by which the hinged frame may be tilted in relation to the main frame, so that when traveling upon a sidehill this frame and wheel may be moved so as to compensate for the incline of the hill and maintain the other parts of the machinery approximately level.

In the accompanying drawings I have illustrated my machine as provided with main longitudinal sills A, and suitable transverse frame-timbers, and upon the left side of the machine looking toward the front the frame is extended to receive the bearing-wheel 2, which is journaled at this side in the extension-frame in the usual manner. The opposite wheel 3, which is on the right side and adjacent to the header or cutting mechanism, is journaled on supplementary longitudinal frame-timbers (shown at 4) and standing parallel with and exterior to the right sill A. These frame-timbers 4 are secured to transverse timbers 5, one of which, 5ª, may be inclined toward the front, as shown, and these timbers are hinged to the left side of the machine, as shown at 6, these hinges being in line with each other and sufficiently separated to give a powerful support to the movable frame.

At the front of the main frame is turnably mounted the usual steering-wheel W, and at the outer end of the header-frame, hereinafter described, is the usual bearing-wheel W'.

In order to allow a sufficient space for the movement of the timbers 5 with relation to their hinge-points 6, I have shown sill A', which is adjacent to the movable wheel, as being raised considerably above the level of sill A, thus providing a sufficient height to allow the timbers 5 to be tilted as much as will be necessary when traveling upon hills of the greatest inclination where the work is likely to be done.

7 represents timbers extending across the main frame supported on posts and extending outwardly on the right side of the machine, so as to provide for the attachment and support of the mechanism necessary for tilting the frame which carries the wheel 3.

Upon the outer longitudinal timbers 4 of the movable wheel-frame vertical standards 8 are fixed, and these standards serve as guides for slides 9, which are fixed to rack-bars 10. These rack-bars are connected by links 11 with the timbers 7 by means of pins, as at 12, which connect the upper ends of the links with the timbers 7, while other similar pins 13 connect the lower ends of the links with the rack-bars. The rack-bars are thus united to the timbers 7, and by reason of the length of the links they are allowed a certain amount of swinging movement as the swinging frame 5 is raised or lowered with relation to the fixed timbers 7.

The vertical movement of the wheel 3 and the connecting-frame is produced as follows: 14 is a shaft journaled to the upright fixed timbers 8 and having fixed upon it pinions 15 at such points that they mesh with the teeth of the rack-bars 10. It will thus be seen that by the revolution of the shaft 14 with its pinions 15 the frame upon which the pinion-shaft is journaled may be moved with relation to the rack-bars which are connected with the fixed timbers 7 by the rolling of the pinions on the rack-bars, which causes the connected parts to be raised or depressed at will. In order to operate this mechanism, I have shown a worm gear-wheel 16, fixed upon the shaft 14 of the pinion-wheels, and a worm 17, engaging this gear, is carried by a shaft, as at 18. Upon the lower end of this shaft is a beveled gear 19, which meshes with pinions 20 and 21 upon the horizontal shaft 22. This shaft has fixed upon it a sprocket-wheel 23 and a chain from a similar sprocket-wheel 24, carried by the bearing-wheel 3, which actuates the shaft 22. The pinions 20 and 21 turn loosely upon the shaft 22; but either of them may be made to turn the beveled gear 19 and the worm-shaft 18 by engaging with them a clutch 25, which slides upon a feather on the shaft 22 and between the gears 20 and 21, thus the shaft 22 always revolving in one direction while the machine is traveling. If the clutch be moved so as to engage with the beveled gear-wheel 20, motion will be transmitted through the beveled gear 19 to rotate the shaft 18 in one direction, and thus acting through the gear 16 and shaft 14 and pinions 15 will cause the latter to roll upon the rack, so as to raise the hinged frame upon which they are carried. By reversing the movement of the clutch 25 and causing it to engage with the beveled gear 21 the movement of the parts will be reversed and the hinged frame will be correspondingly lowered. Thus by means of a lever controlling the clutch and within convenient reach of the operator the raising and lowering of the hinged frame and the wheel 3 carried thereby may be made to correspond with the varying grade of the hillside along which the machine may be traveling, and the part of the machine containing the threshing and cleaning mechanism will be maintained approximately level at all times. The perfection of the level depends upon the skill and promptitude of the operator.

The wheel 2 is provided with curved or angular transverse ribs which are usually made of angle-iron bolted around the rim. These ribs take hold of the ground and increase the frictional adherence of the wheel to the ground, so that all the mechanism which depends upon the revolution of this wheel for its motion will be properly driven.

Although the wheel 3, which is journaled in the tilting-frame 5, will be tilted in unison with the movement of the frame, so that its face will stand parallel with the surface of the ground, it will be seen that the wheel 2 by reason of its being journaled upon the main frame A will always be maintained in a vertical position, and this verticality of this wheel and also of the front or steering wheel, which is also carried upon the main frame, prevents to a great extent the tendency of the machine to slide sidewise on hillsides.

In order to reduce the side strain upon the hinged frame 5, I may in addition to the diagonal position of the brace 5ª employ a tension-rod 27, one end of which is connected with some portion of the hinged movable frame, and the other, extending forward in a diagonal direction, may be connected with the longitudinal sill A' or any other convenient part of the main frame, as at 28.

The header portion of the machine is hinged in the usual or any suitable manner and extends outwardly to the right side looking toward the front, having the usual carrying belt or draper to receive the grain and conduct it into what is called the "feed-house," from which it is delivered to the threshing-cylinder of the machine. Suitable connections of the usual form are also employed for driving the sickle and carrying-belts and reel of the header. These not being important to my present invention are not here shown.

Having thus described my invention, what I claim, and desire to secure by Letters Patent, is—

1. The combination in a traveling harvester of a main thresher-frame, a header, an intermediate supplemental frame to which the header is hinged and which intermediate frame is hinged to the main frame, vertically-disposed rack-bars, a fixed frame extending from the main frame above the intermediate frame, links connecting the rack-bars with said fixed frame, pinions upon the supplemental frame engaging the rack-bars, and mechanism by which the pinions are revolved in either direction.

2. The combination in a traveling harvester of a main frame, a supplemental frame hinged near one side of the main frame extending across and beyond the opposite side thereof, a bearing-wheel journaled upon the main frame, a steering-wheel turnably connected with the front of said main frame, a second bearing-wheel journaled in the outer part of the hinged frame, upwardly-extending racks, pivoted links connecting said racks with fixed extensions from the main frame, pinions carried by the supplemental frame engaging the racks and turnable so as to raise or lower the supplemental frame and a header-frame hinged to the supplemental frame.

3. The combination in a traveling harvester of a main frame, a side bearing-wheel and a front steering-wheel journaled thereto, a supplemental frame hinged upon the side adjacent to the bearing-wheel extending beneath and beyond the opposite side, a bearing-wheel journaled in the outer part of said supplemental frame, racks connected with main-frame extensions, pinions on the supplemental frame engaging said racks, reversing-gear whereby the racks are moved, and a header hinged to the supplemental frame.

4. The combination in a traveling harvester of a main frame having a side bearing-wheel and a front steering-wheel journaled thereto, transverse timbers extending across the main frame and projecting beyond the side opposite to the said bearing-wheel, a supplemental frame extending beneath the main frame, and hinged on the side adjacent to the bearing-wheel, said frame extending beyond the opposite side of the main frame, rack-bars and links by which they are movably connected with the projecting timbers of the main frame, said rack-bars having slides fixed thereto, vertical timbers upon the supplemental frame upon which the slides are movable, a shaft journaled upon the supplemental frame having gears engaging the rack-bars, and mechanism by which said shaft may be turned in either direction to raise or lower the supplemental frame.

5. The combination in a traveling harvester of a main frame with supporting-wheels upon one side and the front, a supplemental frame hinged to the main frame on the side adjacent to its supporting-wheel and extending outwardly beyond the opposite side, a bearing-wheel journaled in the said extension of the supplemental frame, timbers extending across the main frame and projecting above the extension of the supplemental frame, rack-bars, and links by which the bars are movably connected with the extension-timbers of the main frame, slides carried by the rack-bars, upright timbers upon the supplemental frame upon which said slides are movable, a horizontal shaft journaled upon the supplemental frame, having pins engaging with the rack-bars, a worm-wheel mounted upon the pinion-shaft, a worm-gear and a reversible clutch mechanism by which said shaft is actuated from the supplemental bearing-wheel, whereby the supplemental frame may be raised or lowered with relation to the main frame.

6. The combination in a traveling harvester of a main frame having one bearing-wheel, a supplemental frame hinged to the main frame and projecting beyond the opposite side, a header hinged to said supplemental frame, a second bearing-wheel journaled in the supplemental frame, mechanism by which said frame and its wheel are raised or lowered with relation to the main frame, and diagonally-disposed braces connecting the supplemental and main frames.

7. A traveling harvester consisting of a thresher and separator, with main longitudinal frame-timbers, one of which lies in a plane above the other, a supplemental frame adjacent to the elevated side of the main frame, transverse timbers extending from the supplemental frame beneath the raised timber of the main frame, hinges by which said transverse timbers are movably attached to the lower and opposite main-frame timber, bearing-wheels journaled to the main and to the supplemental frames, mechanism by which the supplemental frame may be raised or lowered about its hinges, and a header hinged to the outer side of the supplemental frame.

8. A traveling harvester consisting of a thresher and separator, a header, an intermediate frame to which the header is hinged with a bearing-wheel to said frame, transverse timbers extending from the supplemental frame beneath the main separator-frame, hinges by which the transverse timbers are connected with the longitudinal main-frame timber upon the opposite side from the supplemental frame, and a diagonal brace-timber extending from the supplemental frame and hinged to the main frame in line with the hinges of the transverse timbers.

In witness whereof I have hereunto set my hand.

DANIEL BEST.

Witnesses:
S. V. Du Bois,
T. G. Erickson.